(12) United States Patent
Pledger et al.

(10) Patent No.: US 10,292,399 B2
(45) Date of Patent: May 21, 2019

(54) SURFACE TREATMENT FOR STEEL TO BE USED ON MEAT AND POULTRY PROCESSING EQUIPMENT

(71) Applicant: D & F Equipment Sales, Inc., North Crossville, AL (US)

(72) Inventors: Gene Pledger, Albertville, AL (US); Charles Taylor Peel, Jr., Rougemont, NC (US)

(73) Assignee: D & F Equipment Sales, Inc., North Crossville, AL (US)

( * ) Notice: Subject to any disclaimer, the term of this patent is extended or adjusted under 35 U.S.C. 154(b) by 16 days.

(21) Appl. No.: 15/416,815

(22) Filed: Jan. 26, 2017

(65) Prior Publication Data

US 2017/0208824 A1    Jul. 27, 2017

Related U.S. Application Data

(60) Provisional application No. 62/287,107, filed on Jan. 26, 2016.

(51) Int. Cl.
*C21D 7/06* (2006.01)
*A22C 21/00* (2006.01)
*A22C 17/08* (2006.01)

(52) U.S. Cl.
CPC .......... *A22C 21/0061* (2013.01); *A22C 17/08* (2013.01); *A22C 21/0053* (2013.01); *C21D 7/06* (2013.01)

(58) Field of Classification Search
CPC ....... A22C 21/0061; A22C 17/08; A23B 4/20; A23B 4/26; A23B 4/30; C21D 7/06
See application file for complete search history.

(56) References Cited

U.S. PATENT DOCUMENTS

| | | |
|---|---|---|
| 2,855,094 A | 10/1958 | Zebarth |
| 5,544,736 A | 8/1996 | Piriou et al. |
| 8,624,203 B2 | 1/2014 | Tullo et al. |
| 9,414,606 B2 | 8/2016 | Knott et al. |

OTHER PUBLICATIONS

Millard Manufacturing, Millard PassPROTM—"In-House" Passivation, Case Study, Nov. 12, 2015, p. 1.

*Primary Examiner* — Jessee R Roe
(74) *Attorney, Agent, or Firm* — The Webb Law Firm

(57) ABSTRACT

A method of treating a surface of a poultry processing conveyor includes assembling the conveyor and bead blasting at least one surface of the conveyor to reduce a surface roughness of the surface. The surface of the conveyor may be bead blasted with glass beads. The glass beads may be AH-sized glass beads. The bead blasting of the surface may be conducted at a pressure of approximately 60 psi. The bead blasting of the surface may be directed at a 45-degree angle relative to the surface of the conveyor. The method may further include applying a hydrogen peroxide solution to the surface after the conveyor has been bead blasted. The method may further include shrink-wrapping the conveyor after the conveyor has been bead blasted.

8 Claims, 3 Drawing Sheets

SURFACE TREATMENT FOR STEEL TO BE USED ON MEAT AND POULTRY PROCESSING EQUIPMENT

CROSS-REFERENCE TO RELATED APPLICATIONS

This application claims the benefit of U.S. provisional patent application Ser. No. 62/287,107, filed Jan. 26, 2016, which is hereby incorporated by reference in its entirety.

BACKGROUND OF THE INVENTION

Filed of the Invention

The present invention relates, in general, to a surface treatment for steel and, in particular, for a surface treatment for steel to be used on meat and poultry processing equipment.

Description of Related Art

Presently, in the food processing industry, many meats are processed on an assembly line where workers place the animal to be processed on a conveyor system and workers downstream cut the meat from the bones. The meat is then processed or packaged for human consumption. To increase efficiency, multiple conveyors are used to convey the separate pieces of meat. In this way, once a cut of meat is removed from the bone, that meat can be placed on a conveyor belt and, as other cuts are made, those pieces of meat can be placed on other conveyor belts. This allows the processing facility to separate out the different types and cuts of meat without a manual downstream separation process.

It has become increasingly important in the food processing industry in general, and the poultry processing industry in particular, to provide a sanitary product to the public. A health conscious and knowledgeable public require that the food products available on the market be of the highest quality. Food products must be safe and free from undesirable side effects due to disease-causing bacteria or harmful chemicals being present on the product.

The problem of disease-causing bacteria exists in the poultry processing industry. Bacteria is inherent on the outside of poultry carcasses and as a normal member of their intestinal flora. A typical poultry processing plant operates in a mass production line manner and can serve as a breeding ground for these bacteria. One of the most common breeding grounds for bacteria in the poultry processing plant is the conveyor that transports the poultry carcasses past workers to allow the workers to cut the poultry carcasses. During that process, many of the inherent internal or intestinal bacterial flora of the animal can be released onto the conveyor. Although much of this bacteria can be removed by periodic rinsing and cleaning of the conveyor equipment, the surface roughness of the conveyor equipment may allow bacteria to remain on the conveyor after the equipment has been rinsed and cleaned.

Accordingly, current poultry processing conveyors are difficult to completely sanitize, while often permitting certain bacteria to grow on the equipment surfaces of the conveyor, even after the conveyor equipment has been rinsed and cleaned.

SUMMARY OF THE INVENTION

Generally, it is an object of the present disclosure to provide a surface treatment on the surfaces of a poultry processing conveyor to reduce the amount of bacteria that is permitted to grow on the equipment surfaces so that some or all of the above-described deficiencies in current poultry processing conveyors are overcome.

In one aspect of the disclosure, a method of treating a surface of a poultry processing conveyor includes assembling the conveyor and bead blasting at least one surface of the conveyor to provide a consistent finish on the surface. The surface of the conveyor may be bead blasted with glass beads. The glass beads may be AH-sized glass beads. The bead blasting of the surface may be conducted at a pressure of approximately 60 psi. The bead blasting of the surface may be directed at a 45 degree angle relative to the surface of the conveyor. The method may further include applying a hydrogen peroxide solution to the surface after the conveyor has been bead blasted. The method may further include shrink-wrapping the conveyor after the conveyor has been bead blasted.

In another aspect of the disclosure, a poultry processing conveyor may include a frame, a conveyor belt, and a pair of side walls on opposite sides of the conveyor belt. At least one of the frame and the pair of side walls may be bead blasted to create a consistent, highly cleanable finish on the frame or the pair of side walls.

These and other features and characteristics of the surface treatment method, as well as the meat and/or poultry processing equipment, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a", "an", and "the" include plural referents unless the context clearly dictates otherwise.

DESCRIPTION OF THE INVENTION

Figure 1:
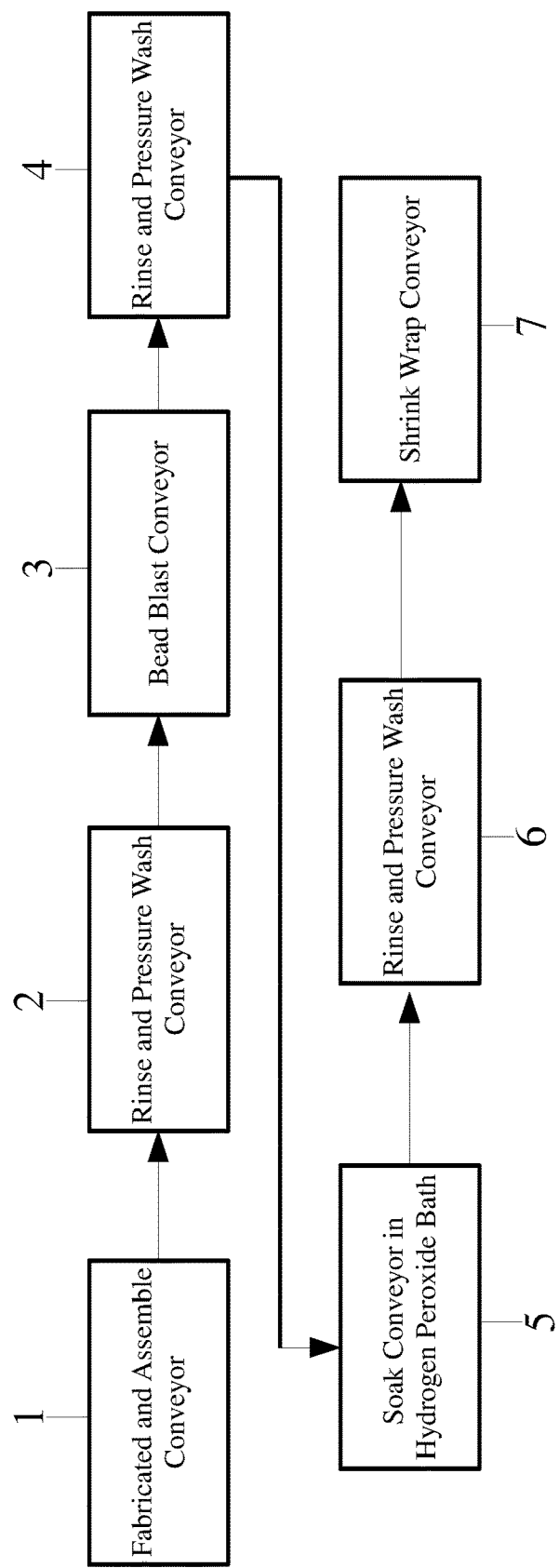
FIG. 1 is a flow chart depicting the steps of the surface treatment method according to an aspect of the present disclosure.

For purposes of the description hereinafter, the terms "upper", "lower", "right", "left", "vertical", "horizontal", "top", "bottom", "lateral", "longitudinal", and derivatives thereof shall relate to the aspect as it is oriented in the drawings. However, it is to be understood that the disclosure may assume many variations and step sequences, except where expressly specified to the contrary. It is also to be understood that the specific devices and processes illustrated in the drawings, and described in the following specification, are simply exemplary aspects of the disclosure. Hence, specific dimensions and other physical characteristics related to the aspects disclosed herein are not to be considered as limiting.

Figure 2:
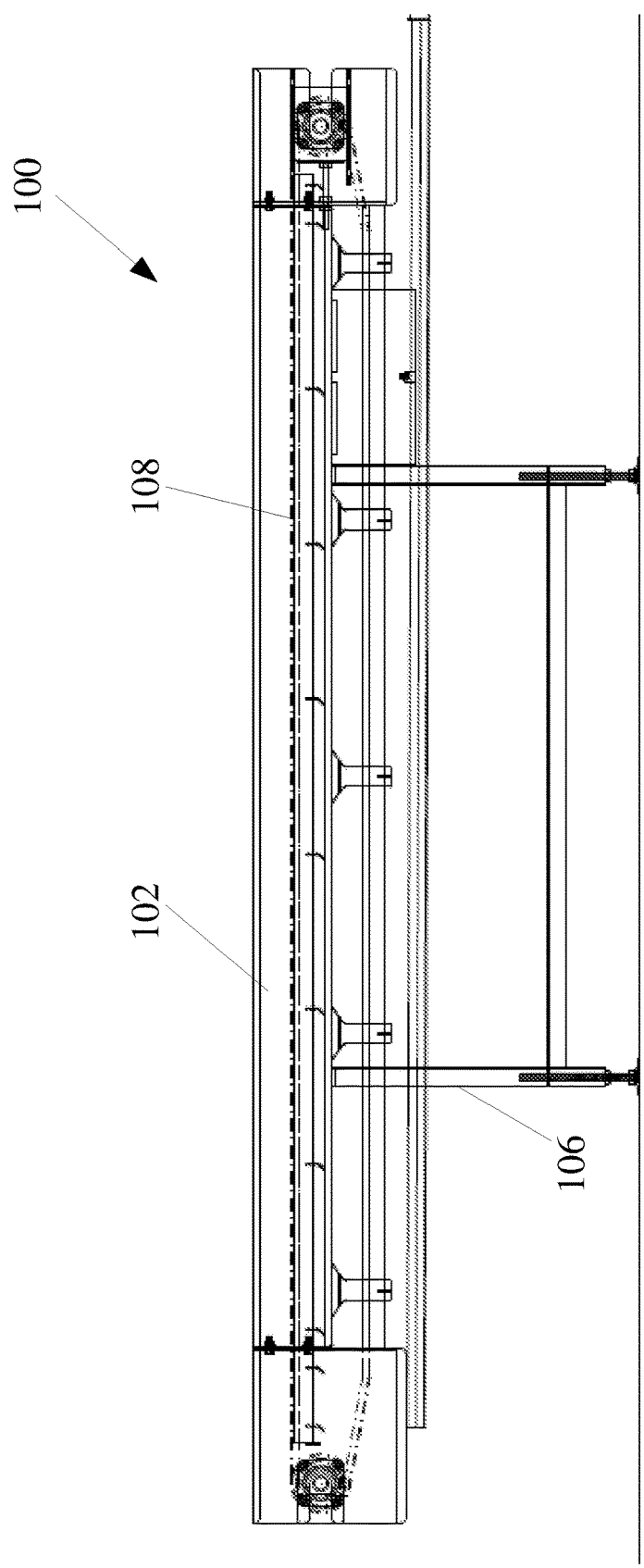
FIG. 2 is a side view of a poultry processing conveyor according to the present disclosure.
Figure 3:
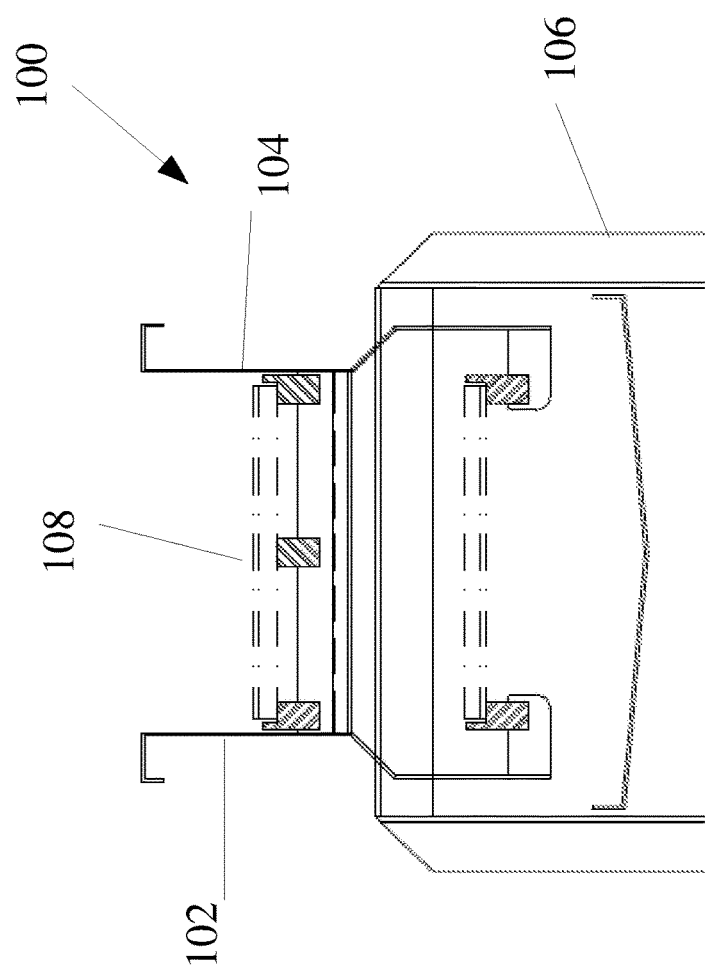
FIG. 3 is a front view of the poultry processing conveyor of FIG. 2.

With reference to FIG. 1, a method of surface treating steel to be used with a meat and/or poultry processing conveyor (hereinafter referred to as "conveyor") will be described. In a first step 1 of the method, a conveyor 100 is fabricated and assembled using stainless steel. The components of the conveyor 100 are made of the stainless steel to improve the sterilization and cleanliness of the conveyor 100. In one aspect, the components may be made of 304 dual grade stainless steel. The stainless steel may be 18, 16, 14, 12, 10, or 7 Gauge or ¼" plate stainless steel. This type of stainless steel typically has a 2B finish with a surface roughness of 8-35 microinches for a 2B finish, and 105-145 microinches for structural finishes. The conveyor 100 may also be made of angle, tube, pipe, flat bar, and/or round bar stainless steel. One example of a conveyor 100 assembled by stainless steel is disclosed in U.S. Pat. No. 9,414,606 entitled "Cone Line and Conveyor System", the disclosure of which is herein incorporated in its entirety by reference, and shown in FIGS. 2 and 3. It is also contemplated that additional meat and/or poultry processing equipment may be fabricated from stainless steel and undergo the same surface treatment as described below. This additional equipment includes overhead poultry transport systems, inspection tables, and any other equipment that uses a 2B finish material. The conveyor 100 may be assembled using any known technique in the art, including welding and/or fastening the individual components together to form the conveyor 100.

After the conveyor 100 has been assembled, in a second step 2, the conveyor 100 may be rinsed and pressure washed. Next, the third step 3 of the process may include bead blasting the conveyor 100 to provide a consistent finish on the surfaces of the conveyor 100. In one aspect, every surface of the conveyor 100 may be bead blasted. In another aspect, only specific surfaces of the conveyor 100 that come into contact with the poultry or meat may be bead blasted. These surfaces may include the side rails 102, 104 and/or the frame that includes legs 106. The conveyor 100 may also include a conveyor belt 108 to transport the poultry and/or meat. The process of bead blasting utilizes bead material such as glass, ceramic beads, or dry ice to produce a non-directional, textured surface with a soft satin appearance and low reflectivity. The finer the beading media, the more corrosion resistant the surface performance. In one aspect, a glass bead with an AH-size may be used for bead blasting the conveyor 100. The AH-sized glass bead may have a nominal diameter of 0.0017-0.0035 inches. It is contemplated that alternative glass beads may be used to bead blast the conveyor 100 to provide a different surface roughness.

Surface roughness is a measure of the texture of a surface. It is quantified by the vertical deviations of a real surface from its ideal form. If these deviations are great, the surface is rough. If the deviations are small, the surface is smooth. Roughness is typically considered to be the high-frequency, short-wavelength component of a measured surface. Therefore, the bead size may affect the surface roughness of the stainless steel surface. The surface roughness of the conveyor 100 also depends on the pressure at which the bead media are blasted on the conveyor 100 and the specific angle at which the bead media are blasted at the conveyor 100. In one aspect, the bead media may be blasted on the conveyor 100 at a pressure range between 20 psi to 60 psi. In a further aspect, the bead media may be blasted on the conveyor 100 at a pressure of 60 psi. The angle at which the bead media is blasted on the conveyor 100 also affects the surface roughness of the stainless steel. Blasting the conveyor 100 at a specific angle also ensures that a uniform bead blasting is applied to the entire surface of the conveyor 100. In one aspect, the bead media may be blasted at an angle ranging between 15 degrees and 45 degrees relative to the conveyor surface. In a further aspect, the bead media may be blasted at a 45 degree angle relative to the conveyor surface.

After the conveyor surfaces have been bead blasted, the conveyor surfaces may have a surface roughness of 30-50 microinches. The bead blasting gives the conveyor 100 a highly satin finish that is corrosion resistant, heat resistant, and smooth. The satin finish is suitable for caustic sanitary wash down procedures that helps to reduce bacteria growth on the conveyor 100 and assists in improving the cleaning process of the conveyor 100. Due to the smoother surface roughness, the surfaces of the conveyor 100 do not have very high vertical deviations, which prevents bacteria and food particles from sticking on the surface during the cleaning process. The satin finish provides a consistent look to the stainless steel components of the conveyor 100. By bead blasting the stainless steel components of the conveyor 100, an individual can assemble a lighter, more polished, cleaner conveyor 100 than is typically provided by traditional glass bead methods. The bead blasting process also reduces the costs of the conveyors 100, which are typically very expensive due to the higher-quality polished stainless steel that has a smooth, bright finish.

After the conveyor 100 has been bead blasted, in a fourth step 4, the conveyor 100 may again be rinsed and pressure washed. Once the conveyor 100 has been rinsed, in a fifth step 5, the conveyor 100 may be placed in a hydrogen peroxide ($H_2O_2$) bath to passivate the stainless steel components of the conveyer 100. In one aspect, a 5% hydrogen peroxide solution may be used in the hydrogen peroxide bath. The hydrogen peroxide bath assists in oxidizing the surfaces of the stainless steel components to improve the corrosion resistance of the components. Using the hydrogen peroxide bath allows for passivation of the stainless steel components. The passivation process enhances the naturally occurring oxidation that makes the stainless steel components so corrosion resistant. Passivation is an acid-based process that changes stainless steel from an "active" state, in which it actively corrodes, to a "passive" state, in which corrosion is resisted. In addition, iron contaminates that become embedded in the surface of the stainless steel during handling and fabrication of the conveyor 100 are dissolved, greatly reducing the potential of rust on the stainless-steel components. In one aspect, the conveyor 100 is placed in the hydrogen peroxide bath for approximately thirty (30) seconds. However, it is also contemplated that the conveyor 100 may sit in the hydrogen peroxide bath for a longer amount of time to increase the corrosion resistance of the stainless steel components. After the conveyor 100 is taken out of the hydrogen peroxide bath, in a sixth step 6, the conveyor 100 may be rinsed and pressure washed again. Finally, in a seventh step 7, the conveyor 100 may be shrink-wrapped for storage until the conveyor 100 is needed for processing meat and/or poultry or shipped to a customer.

While various aspects of the method of surface treatment for the conveyor 100 were provided in the foregoing description, those skilled in the art may make modifications and alterations to these aspects without departing from the scope and spirit of the disclosure. For example, it is to be understood that this disclosure contemplates that, to the extent possible, one or more features or steps of any aspect may be combined with one or more features or steps of another aspect. Accordingly, the foregoing description is intended to be illustrative rather than restrictive. The invention described above is defined by the appended claims, and all changes to the disclosure that fall within the meaning and the range of equivalency of the claims are to be embraced within their scope.

The invention claimed is:

1. A method of treating a surface of a poultry processing conveyor, comprising:
   (a) assembling the conveyor; and
   (b) bead blasting at least one surface of the conveyor to provide a finish on the surface.

2. The method of claim 1, wherein the surface of the conveyor is bead blasted with glass beads.

3. The method of claim 2, wherein the glass beads are AH-sized glass beads.

4. The method of claim 1, wherein the bead blasting of the surface is conducted at a pressure of approximately 60 psi.

5. The method of claim 1, wherein the bead blasting of the surface is directed at a 45-degree angle relative to the surface of the conveyor.

6. The method of claim 1, further comprising applying a hydrogen peroxide solution to the surface after the conveyor has been bead blasted.

7. The method of claim 1, further comprising shrink wrapping the conveyor after the conveyor has been bead blasted.

8. A poultry processing conveyor, comprising:
   a frame,
   a conveyor belt; and
   a pair of side walls on opposite sides of the conveyor belt,
   wherein at least one of the frame and the pair of side walls is bead blasted to reduce a surface roughness of the frame or the pair of side walls.

* * * * *